(12) United States Patent
Marchesotti

(10) Patent No.: US 8,254,679 B2
(45) Date of Patent: Aug. 28, 2012

(54) CONTENT-BASED IMAGE HARMONIZATION

(75) Inventor: Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 989 days.

(21) Appl. No.: 12/250,203

(22) Filed: Oct. 13, 2008

(65) Prior Publication Data

US 2010/0092085 A1 Apr. 15, 2010

(51) Int. Cl.
*G06K 9/00* (2006.01)
*G06K 9/40* (2006.01)
*G06K 9/32* (2006.01)

(52) U.S. Cl. .......................... 382/173; 382/254; 382/294

(58) Field of Classification Search .................. 382/173, 382/254, 294
See application file for complete search history.

(56) References Cited

U.S. PATENT DOCUMENTS

| | | | | |
|---|---|---|---|---|
| 5,414,538 A * | 5/1995 | Eschbach | ...................... | 358/522 |
| 5,767,867 A * | 6/1998 | Hu | .................... | 345/561 |
| 6,009,209 A | 12/1999 | Acker et al. | | |
| 6,169,544 B1 * | 1/2001 | Onoda | ........................ | 715/723 |
| 6,222,947 B1 * | 4/2001 | Koba | .................... | 382/284 |
| 6,278,401 B1 | 8/2001 | Wigren | | |
| 6,278,491 B1 | 8/2001 | Wang et al. | | |
| 6,879,728 B1 * | 4/2005 | Fisher et al. | .................. | 382/254 |
| 7,859,588 B2 * | 12/2010 | Parulski et al. | ............... | 348/349 |
| 2002/0172419 A1 * | 11/2002 | Lin et al. | ...................... | 382/167 |
| 2007/0005356 A1 * | 1/2007 | Perronnin | ..................... | 704/245 |
| 2007/0258648 A1 | 11/2007 | Perronnin | | |
| 2008/0069456 A1 | 3/2008 | Perronnin | | |
| 2008/0144068 A1 | 6/2008 | Digby | | |
| 2008/0317379 A1 * | 12/2008 | Steinberg et al. | ............. | 382/275 |

OTHER PUBLICATIONS

U.S. Appl. No. 11/767,739, filed Jun. 25, 2007, Bressan, et al.
U.S. Appl. No. 11/801,230, filed May 9, 2007, Marchesotti, et al.
U.S. Appl. No. 12/033,434, filed Feb. 19, 2008, Csurka.
U.S. Appl. No. 12/045,807, filed Mar. 11, 2008, Perronnin, et al.
U.S. Appl. No. 12/049,520, filed Mar. 17, 2008, Marchesotti, et al.
U.S. Appl. No. 12/123,511, filed May 20, 2008, Marchesotti, et al.
U.S. Appl. No. 12/123,586, filed May 20, 2008, Marchesotti.
U.S. Appl. No. 12/175,857, filed Jul. 18, 2008, Marchesotti.
U.S. Appl. No. 12/191,579, filed Aug. 14, 2008, Csurka, et al.
A.Levin, et al., Learning to Combine Bottom-Up to Top-Down Segmentation, *ECCV*, 2006.
B.Liebe, et al., Combined Object Categorization and Segmentation with an Implicit Shape Model, *In ECCV'04 Workshop on Statistical Learning for Computer Vision*, May 2004.
D.Larlus, et al., Category Level Obiect Segmentation—Learning to Segment Objects with Latent Aspect Models, *VISAPP*, (2), 2007.
D.Lowe, Object Recognition from Local Scale-Invariant Features, *In ICCV*, 1999.
F.Perronnin, et al., Adapted Vocabularies for Generic Visual Categorization, *In ECCV*, 2006.

(Continued)

*Primary Examiner* — Bhavesh Mehta
*Assistant Examiner* — Utpal Shah
(74) *Attorney, Agent, or Firm* — Fay Sharpe LLP

(57) ABSTRACT

A harmonization system and method are disclosed which allow harmonization of a set of digital images. The images are automatically segmented into foreground and background regions and the foreground and background regions are separately harmonized. This allows region-appropriate harmonization techniques to be applied. The segmenting and harmonizing may be category dependent, allowing object-specific techniques to be applied.

25 Claims, 8 Drawing Sheets

OTHER PUBLICATIONS

F. Perronnin, et al., Fisher Kernels on Visual Vocabularies for Image Categorization, *In CVPR*, 2007.

N. Petkov, et al., *Canny Edge Detector (Canny Filter) for Image Processing and Computer Vision*, http://matlabserver.cs.rug.nl/cannyedgedetectionweb/web/, downloaded Aug. 20, 2008.

K. Mikolajczyk, A Performance Evaluation of Local Descriptors, *IEEE Transactions on Pattern Analysis & Machine Intelligence*, vol. 27, No. 10 (2005).

M. J. Jones, et al., Statistical Color Models with Application to Skin Detection, *IJVC*(46), No. 1, pp. 81-96, Jan. 2002.

R. Eschbach, et al., Automatic Processing of Color Images for User Preference, *Proceedings of SPIE Conference on Color Imaging*, vol. 3648, pp. 404-410 (1998).

T. W. Tai, et al., Local Color Transfer Via Probabilistic Segmentation by Expectation-Maximization, *IEEE*, 2005.

* cited by examiner

CONTENT-BASED IMAGE HARMONIZATION

CROSS REFERENCE TO RELATED PATENTS AND APPLICATIONS

The following copending applications, the disclosures of which are incorporated herein by reference in their entireties, are mentioned:

U.S. application Ser. No. 11/801,230, filed May 9, 2007, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.

U.S. application Ser. No. 11/767,739, filed Jun. 25, 2007, entitled CLASS-BASED IMAGE ENHANCEMENT SYSTEM, by Marco Bressan, et al.

U.S. application Ser. No. 12/033,434, filed Feb. 19, 2008, entitled CONTEXT DEPENDENT INTELLIGENT THUMBNAIL IMAGES, by Gabriela Csurka.

U.S. application Ser. No. 12/049,520, filed Mar. 17, 2008, entitled AUTOMATIC GENERATION OF A PHOTO GUIDE, by Luca Marchesotti, et al.

U.S. application Ser. No. 12/123,511, filed May 20, 2008, entitled IMPROVING IMAGE VISUALIZATION THROUGH CONTENT-BASED INSETS, by Luca Marchesotti, et al.

U.S. application Ser. No. 12/123,586, filed May 20, 2008, entitled METHOD FOR AUTOMATIC ENHANCEMENT OF IMAGES CONTAINING SNOW, by Luca Marchesotti.

U.S. application Ser. No. 12/175,857, filed Jul. 18, 2008, entitled SYSTEM AND METHOD FOR AUTOMATIC ENHANCEMENT OF SEASCAPE IMAGES, by Luca Marchesotti.

U.S. application Ser. No. 12/191,579, filed on Aug. 14, 2008, entitled SYSTEM AND METHOD FOR OBJECT CLASS LOCALIZATION AND SEMANTIC CLASS BASED IMAGE SEGMENTATION, by Gabriela Csurka, et al.

U.S. application Ser. No. 12/045,807, filed Mar. 11, 2008, entitled COLOR TRANSFER BETWEEN IMAGES THROUGH COLOR PALETTE ADAPTATION, by Florent Perronnin, et al.

BACKGROUND

The exemplary embodiment relates to digital image processing. It finds particular application in connection with the automated harmonization of a set of images in which the harmonization process is specific to a content-based category assigned to the images in the set.

The creation of multimodal documents which include multiple images, often arranged in close proximity to one another, typically involves a number of processing steps, including resizing of images, cropping of relevant parts, image enhancement, and the like as well as complementing the images with appropriate choices of text features, such as font, size and color, and overall layout of the document. When images are arranged in close proximity to one another, either on the same page or on closely adjacent pages of the same document, differences in the images are emphasized and may detract from the overall aesthetic impact of the document. For example, a graphic designer of a newsletter may wish to include an arrangement of portraits of several people for a company newsletter. The portraits may have been obtained at different times under different lighting conditions and against different backgrounds. The graphic designer may apply manual touch-up operations to make the images look more homogeneous, such as manually identifying the background region and recoloring it, making faces of approximately the same dimensions, and adjusting overall image characteristics, such as color balance, sharpness, white balance, resolution, color noise, brightness, contrast, luminosity, removing digital artifacts and analog artifacts, and the like. However, these harmonization operations are time consuming and often impractical unless high document quality is a requirement.

There remains a need for an automated or semi-automated method of image harmonization for applications such as those mentioned above.

INCORPORATION BY REFERENCE

The following references, the disclosures of which are incorporated in their entireties by reference, are mentioned:

U.S. Pat. No. 6,879,728, issued Apr. 12, 2005, entitled MULTIPLE IMAGE HARMONIZATION SYSTEM, by Fisher, et al., discloses a computer system and computerized method of harmonizing a plurality of images. First a plurality of images is selected. Next, a plurality of characteristics of each one of the plurality of images are evaluated. Then, at least one of the plurality of characteristics is selected to harmonize and the selected characteristic is harmonized in at least one of the plurality of images. Finally, the harmonized image or images are output.

U.S. Pub. No. 2007/0005356, entitled GENERIC VISUAL CATEGORIZATION METHOD AND SYSTEM, U.S. Pub. No. 2007/0258648, entitled GENERIC VISUAL CLASSIFICATION WITH GRADIENT COMPONENTS-BASED DIMENSIONALITY ENHANCEMENT, and U.S. Pub. No. 2008/0069456 entitled BAGS OF VISUAL CONTEXT-DEPENDENT WORDS FOR GENERIC VISUAL CATEGORIZATION, all by Florent Perronnin, disclose systems and methods for categorizing images based on content.

U.S. Pub. No. 2008/0144068, published Jun. 19, 2008, entitled PRINTER WITH IMAGE CATEGORIZATION CAPABILITY, by Anthony Digby, discloses a printer which prints images according to an image content-based category.

BRIEF DESCRIPTION

In one aspect of the exemplary embodiment, an image harmonization system includes memory which stores a set of processing components and a processor in communication with the memory which executes the processing components. The processing components include a segmenting component which, for each of a plurality of input images, segments the image into a foreground region and a background region, a foreground harmonization component which harmonizes the foreground regions of the input images, and a background harmonization component which harmonizes the background regions of the input images separately of the foreground regions.

In another aspect, an automated harmonization method includes, for each of a plurality of input images, segmenting the image into a foreground region and a background region. The method further includes harmonizing foreground regions of the input images, harmonizing background regions of the input images separately of the foreground regions and, for each of the images, blending the foreground and background regions into a combined image. The plurality of blended images are output.

In accordance with another aspect of the exemplary embodiment, a harmonization method includes inputting a set of digital images and, for each of a plurality of the input images, automatically segmenting the image into a foreground region and a background region. The method further includes selecting a target foreground image from the input images and selecting a target background image from the input images. The method further includes providing for automatic harmonization of the foreground region of at least one of the input images with the target foreground image and providing for automatic harmonization of the background region of at least one of the input images with the target background image. The method further includes providing for blending the optionally harmonized foreground and background regions of respective segmented images and outputting the set of images.

BRIEF DESCRIPTION OF THE DRAWINGS

FIG. 4 graphically illustrates the generation of a mask for segmenting a set of images wherein

DETAILED DESCRIPTION

Aspects of the exemplary embodiment relate to a computerized system and a method for harmonizing a set of input images. In the method, images are segmented into a background region and a foreground region. The foreground region is intended to encompass those pixels forming an object of interest in the images, while the background region comprises the remainder of the pixels. Foreground and background regions of the images are then harmonized separately. Finally, the harmonized set of images is output.

By harmonization, it is meant that for one or more characteristics of the image, variations between the images in the set of images are reduced for the respective foreground and/or background region of the image. The harmonization of a group of images sharing the same content generally consists of the joint manipulation of some aesthetic characteristic, such as one or more of composition, color balance, sharpness, white balance, resolution, color noise, brightness, contrast, luminosity, and the like, to reduce differences between images in the set. The aim is to make the group of images look better as a group. As will be appreciated, with an automated or semi-automated system, such a subjective aim may not always be achieved.

In one exemplary embodiment, the method includes categorizing the set of images into one of a set of predefined categories; segmenting foreground and background regions, based on the content of the images; selection of target image (s) for driving the harmonization; harmonization of image composition; and, separately harmonization of the image foreground region and harmonization of the image background region. The categorization may inform one or more of the subsequent steps of segmenting the images, image harmonization, foreground harmonization, and background harmonization. For example, the segmentation may be performed using a segmenting method appropriate for the assigned category. Harmonization of the aesthetic characteristics (composition, color, etc) of the images, based on the assigned category, may involve the selection of target images used as references.

The term "color," except as noted, is intended to broadly encompass any characteristic or combination of characteristics of the image pixels to be adjusted. For example, the "color" may be characterized by one, two, or all three of the red, green, and blue pixel coordinates in an RGB color space representation, or by one, two, or all three of the L, a, and b pixel coordinates in an Lab color space representation, or by one or both of the x and y coordinates of a CIE chromaticity representation, sand the like. Additionally or alternatively, the color may incorporate pixel characteristics such as intensity, hue, brightness, and the like. The term "pixel" as used herein is intended to denote "picture element" and encompasses image elements of two-dimensional images or of three dimensional images.

Figure 1:
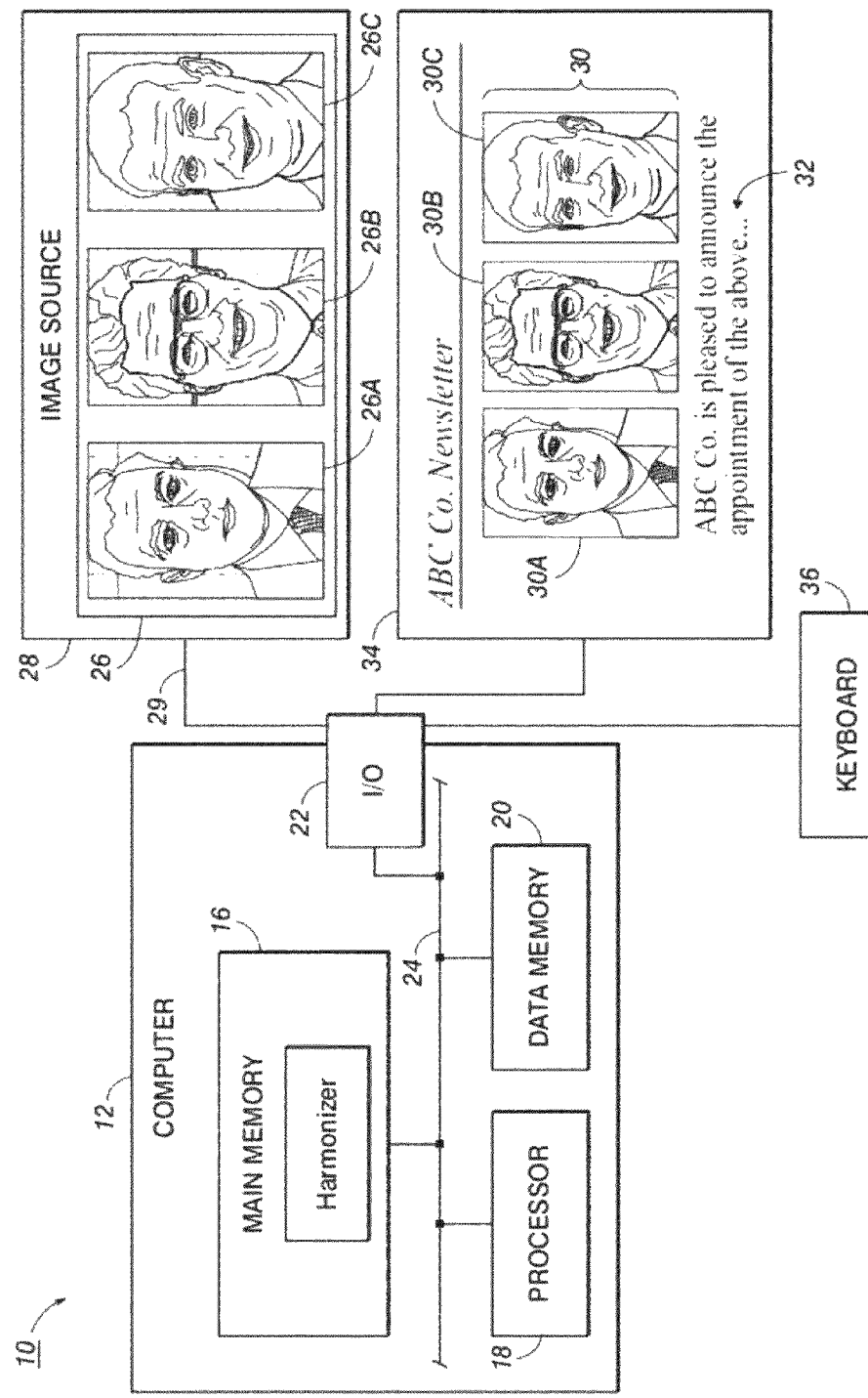
FIG. 1 is a functional block diagram of a computer implemented harmonization system embodied in a computer.

FIG. 1 illustrates an exemplary system 10 for harmonizing a set of images. The system 10 may be embodied in one or more computing devices, such as a general purpose computer 12, e.g., a desktop or laptop computer, or a dedicated computing device, such as a web-based server or network server. The system 10 includes an image harmonizer 14 for harmonizing images. Harmonizer 14 may be embodied in hardware or software. In the exemplary embodiment, the image harmonizer 14 comprises software instructions, which may be stored in the computer's main memory 16. An associated processor 18, such as a CPU, in communication with the main memory 16, executes the instructions. The system 10 may further include data memory 20 for storing images during processing, which may be incorporated in or separate from the main memory 16. The system 10 may communicate with other devices via the computer's input/output component (I/O) 22. Components of the system 10 may communicate via a data control bus 24.

A set 26 of images 26A, 26B, 26C, etc. to be processed (harmonized) is received by the system 10 from an image source 28. As can be seen, the original images 26A, 26B, 26C may have different aesthetic properties: e.g., face ovals have different sizes, positions and skin tones, backgrounds are non-homogeneous, and so forth.

The image source 28 may be a customer's computer, a portable memory storage device such as a disk, an image acquisition device, such as a digital still or video camera, a scanner, or other device with image data storage capacity. In one embodiment, the image source 28 is a customer's computer, which is linked to the system 10 via a wired or wireless link 29, such as a computer network or the Internet. In another embodiment, the system 10 is resident on a computing device operated by the customer.

After harmonization, a set 30 of processed images 30A, 30B, 30C, is output by the system 10. The processed images 30A, 30B, 30C may be incorporated, as a set, into a digital document 32, either by the system 10 or subsequent to being output. In one embodiment, the images in the set 30 are output to a display 34, which may be directly linked to the computer system 12, as shown, or linked to the customer's computer 28. In another embodiment, the set of images 30A, 30B, 30C is returned to the customer, e.g. in tangible media, such as a disk, or electronically, via the wired or wireless link 29.

Alternatively, the processed images 30A, 30B, 30C may be sent to a designated recipient in a similar manner. In other embodiments, the set of images 30A, 30B, 30C may be output to an image rendering device, such as a printer. A user input device 36, such as a keyboard, keypad, touch screen, or the like may be linked to the system 10, either directly, as shown, or via the customer's computer 28.

Figure 2:
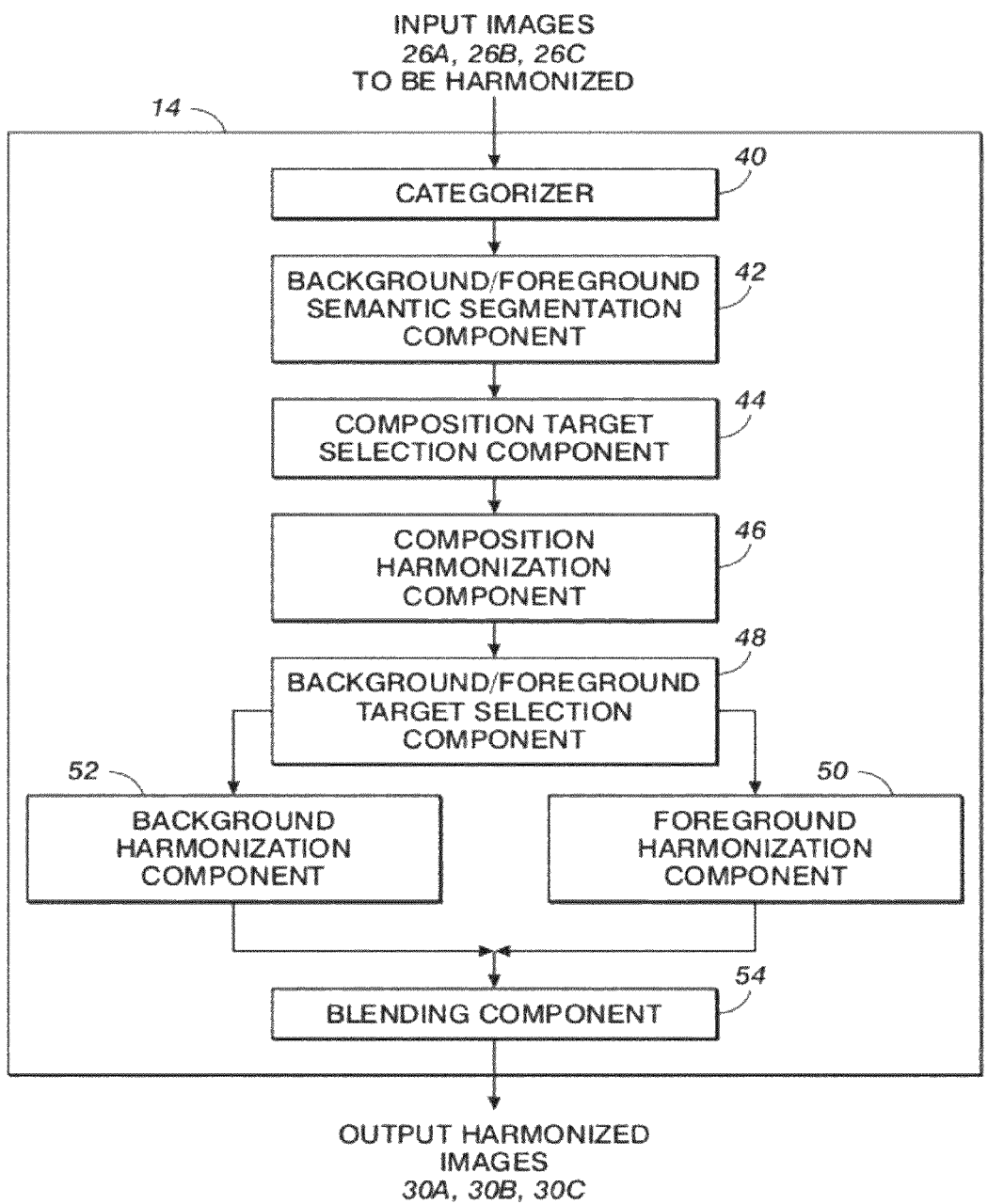
FIG. 2 illustrates processing components of the exemplary harmonization system.
Figure 3:
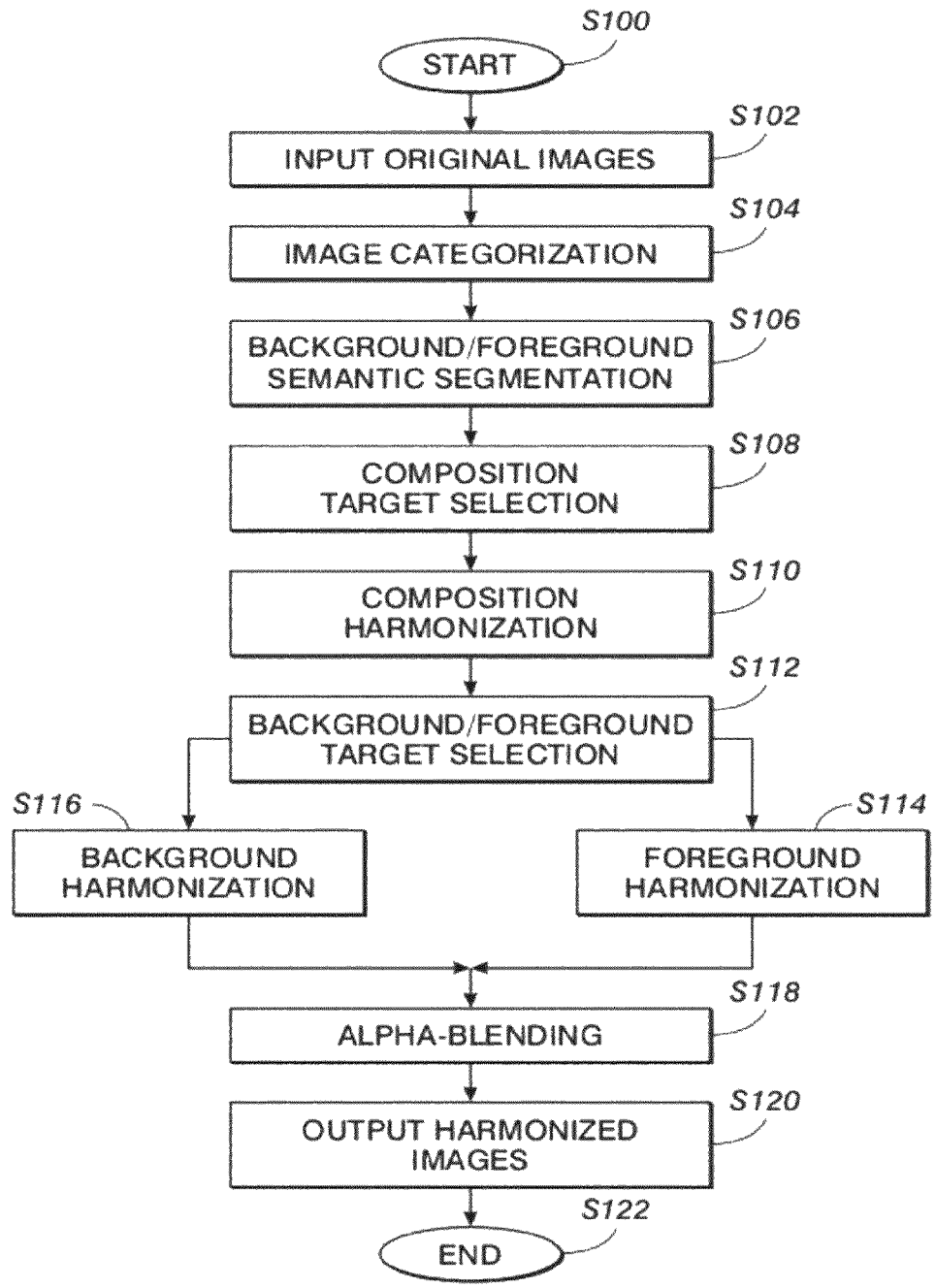
FIG. 3 illustrates a flow diagram of an exemplary method for harmonizing images.

With reference now to FIG. 2, the harmonizer 14 may include various processing components 40, 42, 44, 46, 48, 50, 52, which for illustration purposes are shown as separate blocks, although it is to be appreciated that various ones of the software components may be combined or split into additional components. In the illustrated embodiment, the components include a categorizer 40, a background/foreground (BG/FG) segmenting component 42, a composition target selection component 44, a composition harmonization component 46, a background/foreground target selection component 48, a foreground harmonization component 50, a background harmonization component 52, and a blending component 54. The functions of these components are best understood with reference to the exemplary processing method, which is illustrated in FIG. 3, and will not be described in detail here.

Briefly, given a set of images 26A, 26B, 26C, etc., the categorizer 40 automatically assigns a label to the each of the images corresponding to an image category selected from a set of image categories. The categories are based on image content. Exemplary categories are semantic categories, such as headshots (portraits, faces), and object categories, such as cars, buildings, furniture, and the like. The categories in the group of categories may be selected to reflect the types of images likely to be processed by the system.

The assigned label is used by the background/foreground segmenting component 42 to identify an appropriate segmenting method for segmenting each of the images into foreground and background regions. In one embodiment, the categorizer 40 assigns the category based on an automated analysis of image content. In another embodiment, the images may be manually categorized, in which case the categorizer serves merely as an interface with the customer for receiving the category and associating a label with the image (s). In the event that the system 10 is intended to be used only for images of one category, such as headshots, the categorizer may be omitted.

The segmenting component 42 receives as input the category assigned by the categorizer 40 and the segmentation is based on the assigned category. For example, the segmenting component may apply a first segmenting process for a first of the categories (e.g., headshots) and a second, different segmenting process for a second of the categories (e.g., cars).

The composition target selection component 44, selects a target image from the set of images which the composition of the other images is to be harmonized towards. The selection of a target image may be automatic, based on a predefined set of composition rules appropriate to the class assigned by the categorizer or may be based on a manual selection. For example, in the case of images 26A, 26B, 26C, the composition target selection component 44 presents the set of images to the user and asks the user to select the image with the aesthetically preferred composition. For example, the user may select image 26B as having an appropriate face size, relative to the size of the image, and appropriate position on the image.

The optional composition harmonization component 46 harmonizes the other images 26A, 26C in the set to more closely emulate, where possible, the composition of the composition target image 26B.

The background/foreground target selection component 48 selects a target image from the set of images which the background of the other images is to be harmonized towards and selects a target image from the set of images which the foreground of the other images is to be harmonized towards. The selection of the target background and foreground images may be automatic, based on a predefined set of rules appropriate to the class assigned by the categorizer or may be based on a manual selection. For example, in the case of images 26A, 26B, 26C, the background/foreground target selection component 48 presents the set of images to the user and firsts asks the user to select the image with the aesthetically preferred background. For example, the user may select image 26A as having the whitest or most uniform background. The background/foreground target selection component 48 then asks the user to select the image with the aesthetically preferred foreground. For example, the user may select image 26B as having sufficient shadows to make the features of the face visible but not too heavy shadows to give the face an unnatural appearance. In the case of automatic selection, characteristics such as color balance (including brightness, contrast, luminosity, and white balance), sharpness, resolution, etc, may be considered in selecting the foreground and background target images.

The foreground harmonization component 50 harmonizes foreground regions of the other images 26A, 26C in the set to more closely emulate the characteristics of the foreground region of the foreground target image 26B. The foreground harmonization component 50 may incorporate or access an image adjustment system of the type described in application Ser. No. 12/045,807 for performing the harmonization.

The background harmonization component 52 harmonizes the other images 26B, 26C in the set to more closely emulate the characteristics of the background region of the background target image 26A. The background harmonization component 52 may also utilize an image adjustment system as described above for the foreground region, however, in this case, the focus is on pixels of the respective background regions of the image and target images.

The blending component 54 blends the outputs of the foreground and background harmonization components for each image.

With reference to FIG. 3, an exemplary method for harmonizing a set of images which may be performed with the apparatus illustrated in FIG. 1 is illustrated. The method begins at S100.

At S102, a set 26 of images to be harmonized is input to the system 10.

At S104, the set of images is categorized, based on image content, into one of a group of predefined image categories. A category label can then be associated with the set of images, to be used in one or more of the subsequent steps. The exemplary system is intended to be used to process a set of images in which all the images in the set can be assigned to the same category. If a set of images is received which comprises images in different categories, the set of images may be split into two or more subsets, based on category, and the subsets separately processed. Alternatively, the images in the set may all be assigned the predominant category.

At S106, the input images are each segmented into foreground and background regions. The segmentation technique (s) used is based on the category assigned at S104. While reference is made to background and foreground regions, the foreground region can be considered to be the region corresponding to the assigned category while the background region is everything else. Typically, the background region has a border with the foreground region and at least partly surrounds it.

At S108, a target image is optionally selected from the set of images for composition harmonization.

At S110, the images in the set may be harmonized with respect to composition.

At S112, a target image is optionally selected from the set of images for background and foreground harmonization (or a separate target for foreground and one for background).

At S114, the foreground regions of the images are harmonized with the foreground target image, which may involve changing pixel values in the foreground region of one or more of the images in the set.

At S116, the background regions of the images are harmonized with the background target image, which may involve cropping the background region and/or changing pixel values in the background region of one or more of the images in the set. Steps S114 and S116 may take place contemporaneously, or in sequence.

At S118, for each image, the foreground region is blended with the background region.

At S120, the harmonized images in the set are output.

The method ends at S122.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for harmonizing images.

Further details of the exemplary system and method now follow.

Image Input (S102)

Typically, each input digital image 26A, B, C includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single image data channel, however expressed (e.g., L*a*b*, RGB, YCbCr, monochrome optical density, etc.). The images may be photographs, video images, combined images which include photographs along with text, and/or graphics, or the like. The images may be received in JPEG, GIF, JBIG, BMP, TIFF or other common file format used for images and which may optionally be converted to another suitable format prior to processing. Input images may be stored in data memory 20 during processing.

Image Categorization (S104)

In the image categorization step, the set of images are categorized manually or automatically. In an automated method the categorizer assigns a label to each image corresponding to one of a set of predefined categories.

In one embodiment, the categorizer comprises a face detector. The face detector is applied to each image and if a threshold proportion of face pixels are detected, the image is categorized as "headshot", otherwise, it is categorized as "other object." Exemplary face detectors which may be employed herein are disclosed in U.S. Pub. No. 2002/0172419, entitled IMAGE ENHANCEMENT USING FACE DETECTION, by Lin, et al., the disclosures of which are incorporated herein in their entireties by reference. Other methods for face detection rely on detection of skin, based on color, which allows generation of a skin probability mask. Images having a threshold proportion of pixels with a high probability of being skin are then classed as "headshot." Other face detection techniques may also be employed, as disclosed, for example, in U.S. Pat. Nos. 6,009,209, 6,278,491, and 6,278,401.

If the images are in the "other object" category, further categorization techniques may be applied to identify the type of object, such as car, building, etc.

In another embodiment, a Generic Visual Categorization technique is employed for categorizing the image. Automated categorization techniques of this type are described, for example, in above-mentioned U.S. Pub. Nos. 2007/0005356, 2007/0258648, and 2008/0069456, incorporated by reference. Briefly, such automated categorization techniques typically involve extracting low level features of the image, then forming a higher level representation or representations of the image, based on the extracted low level features, and comparing the high level representation(s) to one or a set of stored representations indexed by category.

The low level features may be extracted from patches of the image, which may be selected based on keypoints or based on a regular grid at one or more magnifications. For each patch, one or more types of feature may be extracted, which is representative of the patch. Exemplary features which can be used include, for example, gradient histograms, vectors (e.g., concatenated pixel colorant or gray level values), and the like.

For example, Scale Invariant Feature Transform (SIFT) descriptors (as described by Lowe, in "Object Recognition From Local Scale-invariant Features", ICCV (International Conference on Computer Vision), 1999) are computed on the patches (e.g., normalized Harris affine regions or patches extracted on a grid). SIFT descriptors are multi-image representations of an image neighborhood. More specifically, SIFT descriptors are generally Gaussian derivatives computed at eight orientation planes over a four-by-four grid of spatial locations, giving a 128-dimensional vector. The dimensionality of the vectors may be reduced, for example, using principal component analysis (PCA), to about 50 dimensions without significant loss of information.

Other features may be used, as described, for example, in K. Mikolajczyk, "A performance evaluation of local descriptors," IEEE Transactions on Pattern Analysis & Machine Intelligence, Vol. 27, No. 10 (2005). Above mentioned U.S. Pub Nos. 2007/0005356, 2007/0258648, and 2008/0069456 also provide descriptions of feature extraction methods.

A high-level representation may then be derived, based on the low level features of the patch. For example, the patch is described by a Gaussian mixture model (GMM) which has been previously trained offline on a large set of low-level features. The model can be trained in an unsupervised manner or in a supervised manner. Each patch of an input image is then described by a set of emission probabilities of the low level features for each of the Gaussian functions in the model. In one embodiment, the high level representation is a bag-of-words representation, as disclosed in U.S. Pub. No. 2007/0005356 and F. Perronnin, C. Dance, G. Csurka and M. Bressan, *Adapted vocabularies for generic visual categorization*, ECCV 2006 (collectively referred to Perronnin 2006), where each Gaussian corresponds to a visual word. An alternative to the bag-of-words representation is a gradient representation (Fisher Kernel) as disclosed in F. Perronnin and C. Dance, *Fisher Kernels on Visual Vocabularies for Image Categorization*, CVPR 2007, and U.S. Pub. No. 2007/0258648 (collectively referred to herein as Perronnin 2007).

A single model can be generated for all categories, as disclosed in Perronnin 2007. Alternatively, a different model can be created for each category, as disclosed in Perronnin 2006. Thus, in the exemplary embodiment, there may be a first model for the category "headshot", another for "buildings", etc. In this approach, for each category, the features of the image may be compared to two models, one for the category, and the other being a universal model trained on generic features, allowing a determination to be made as to whether the image is best described by the category model or the universal model. As an alternative to GMMs, the generative model may be based on Hidden Markov Models, or a combination of GMMs and HMMs.

The output of the categorization step is a set of images labeled with the most probable category.

Semantic Segmentation of Each Image into Background and Foreground Regions (S112)

In this step, each of the images 26A, B, C, etc., is processed to classify the image's pixels into two (or more) regions based on their content (e.g., foreground and background, skin/non skin, etc.).

The segmentation process is selected, dependent on the assigned category. For example, in the case of images classed as headshots, face and/or skin recognition techniques may be employed. In the case of other objects, known features of those objects, such as texture, color, or the like may be used to identify the foreground and background regions.

In one embodiment, a simple approach leveraging shape information may be employed. This approach is particularly applicable to headshots, but may also find application for other image categories. FIGS. 4 and 5 illustrate an exemplary segmentation method on a headshot image.

Figure 4A:
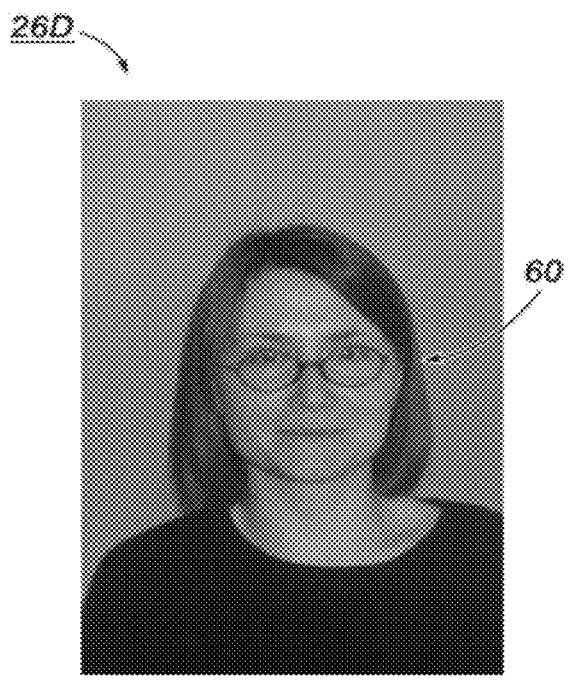
FIG. 4A shows an original image.
Figure 4B:
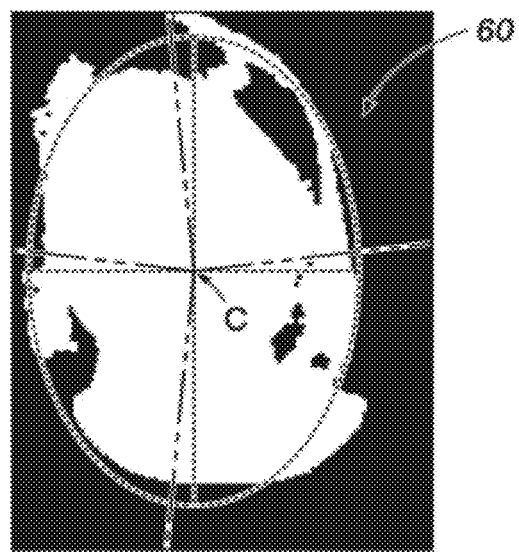
FIG. 4B, the image registered using headshot center of mass.
Figure 4C:
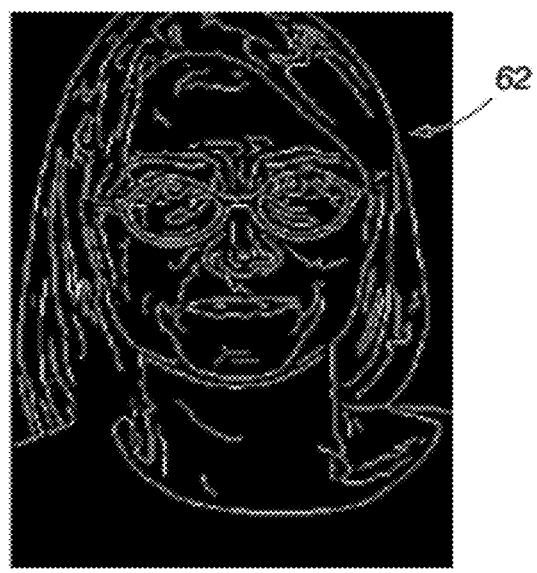
FIG. 4C, an edge map obtained by original processing the original image with a Canny derivative filter.
Figure 5:
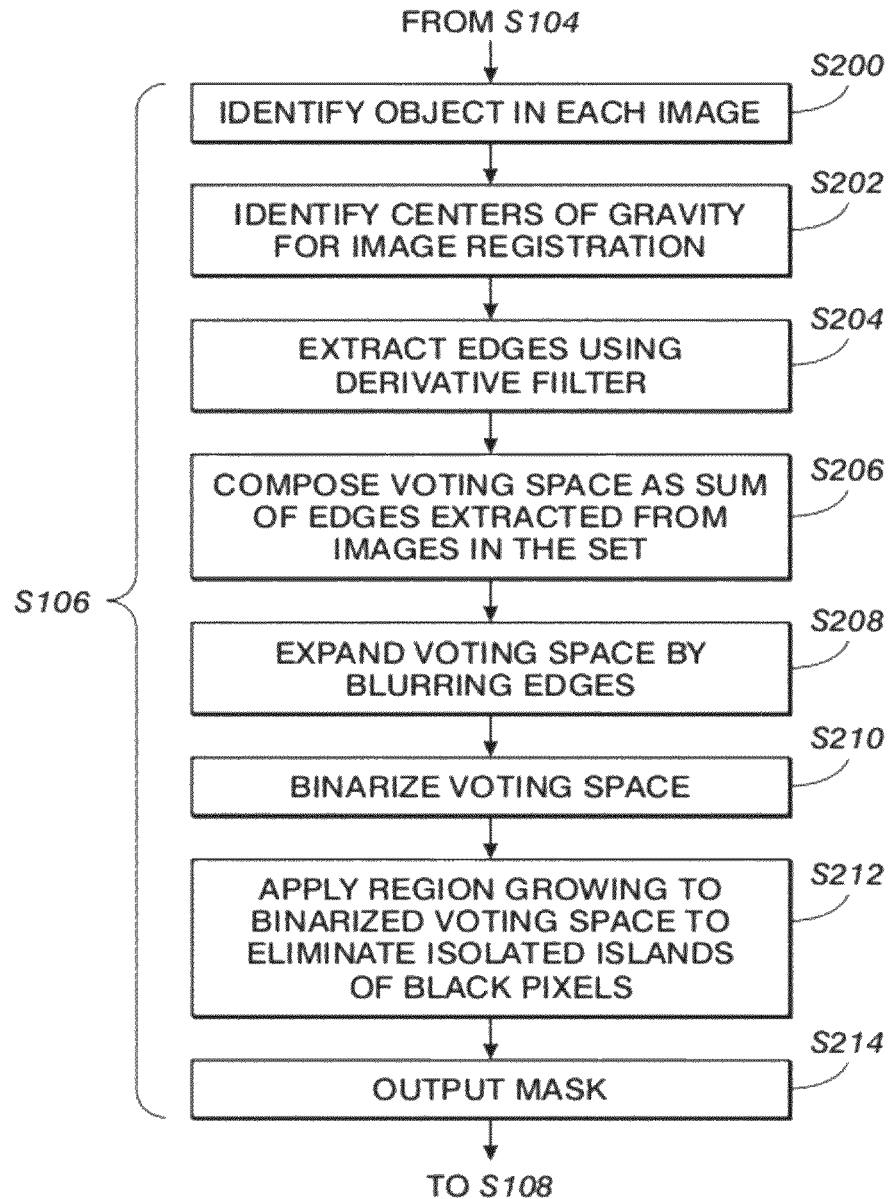
FIG. 5 illustrates exemplary substeps of the method illustrated in FIG. 2.

At S200, the object 60 (to be the basis of the foreground region) in the original image 26D (FIG. 4A) is roughly identified (FIG. 4B). This step may result from the image categorization step, such as the location of the face pixels in a headshot image. For other objects, color or other recognizable feature may be used to identify the object.

At S202, the center of mass C of the object 60 is determined (FIG. 4B). This subsequently allows for registration in S206. This may be determined as the intersection of horizontal and vertical lines representing centers of gravity of the object pixels in horizontal and vertical directions (equal numbers of white pixels to each side of the line in the exemplary embodiment), or by some other suitable method.

At S204, edges of the object 60 are extracted with a derivative filter (e.g., Canny filter) (FIG. 4C) to generate an edge map 62. Canny filters are known in the art (See, e.g., J. F. Canny: A computational approach to edge detection. *IEEE Trans. Pattern Analysis and Machine Intelligence*, 8 (6), 1986, 679-698). A Canny filter can be described as a convolution of a Gaussian operator and a step operator. A Gaussian operator is a set of integers that approximate the profile of a Gaussian function along any row, column or diagonal.

Figure 4D:
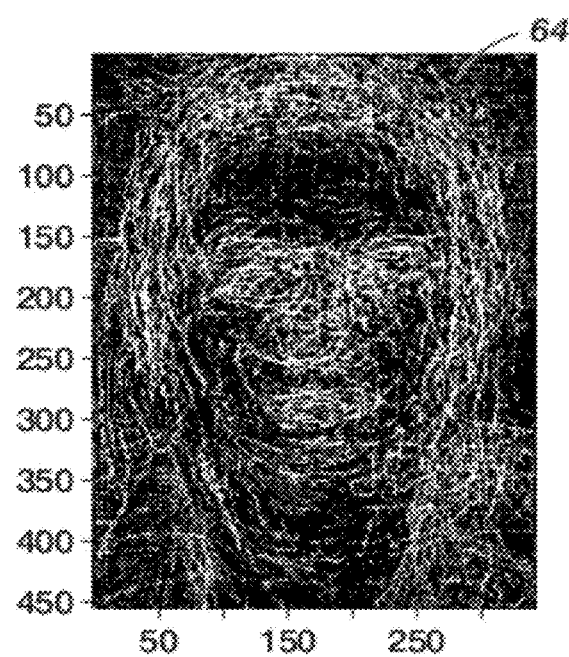
FIG. 4D, a voting space composed by summing up the edge maps of the images in the set.

At S206, a voting space 64 is composed by summing up the edge maps 62 extracted in all the input images 26A, B, C, D, etc. (FIG. 4D). The centers of gravity C of each image are used to register the edge maps.

Figure 4E:
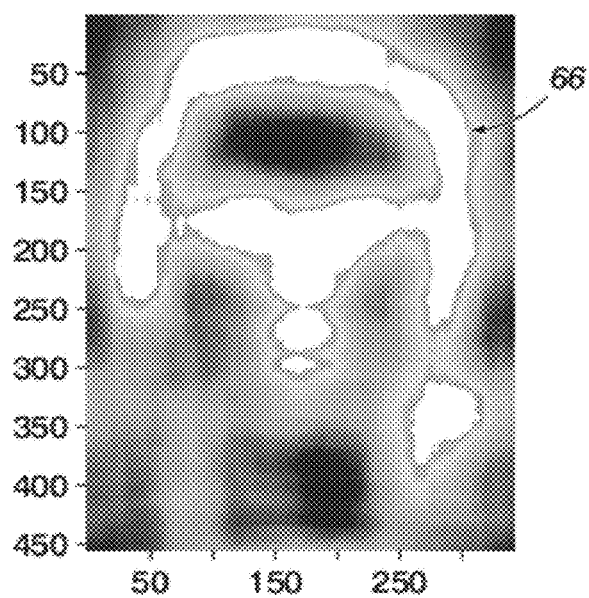
FIG. 4E, the voting space blurred with an averaging filter.

At S208, the voting space 64 is blurred with an averaging filter, e.g., of dimension 50×50 pixels, to generate a blurred voting space 66. (FIG. 4E). At this stage, the pixels each have a value (e.g., ranging between 0 and 1) which is representative of whether the pixel is likely to be background or foreground.

Figure 4F:
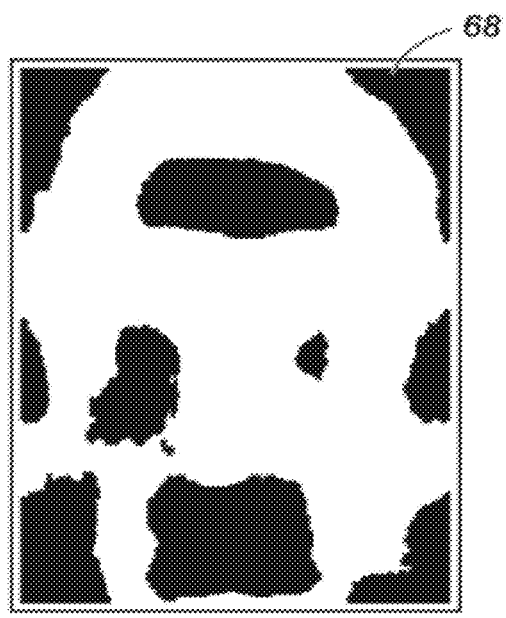
FIG. 4F, the blurred voting space binarized.

At S210, the resulting voting space 66 is binarized (using a threshold of, e.g., 0.7) to generate a binarized map 68 in which skin pixels (white regions, comprising pixels with values at or above the threshold) are separated from any non-skin pixels (black regions). (FIG. 4F).

Figure 4G:
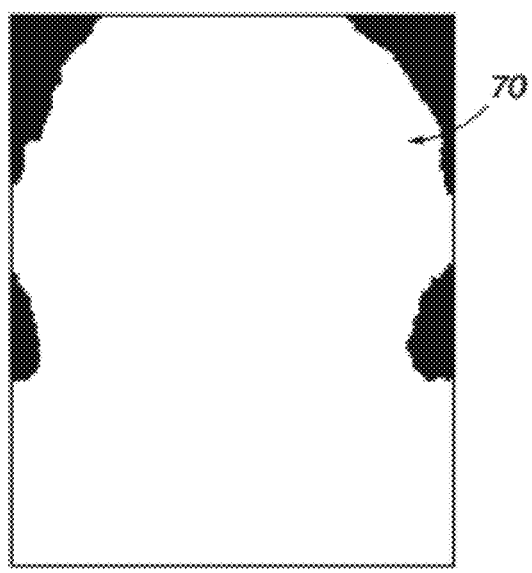
FIG. 4G, a mask with regions labeled as background (black pixels) and foreground (white pixels) and FIG. 4H, foreground and background regions of the original image identified using the mask.
Figure 4H:
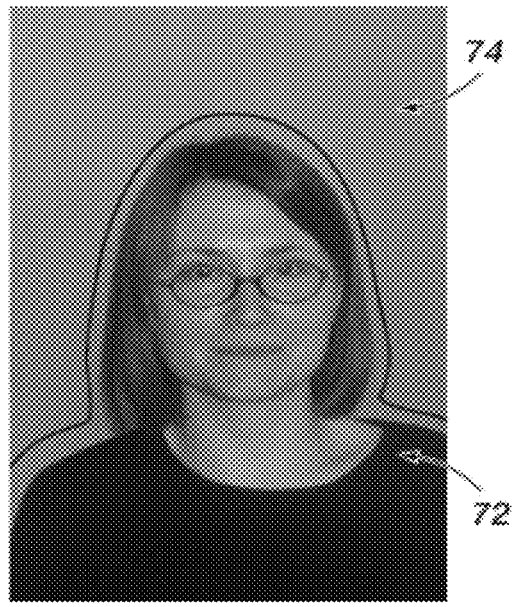

At S212, region growing is applied to extract a final mask 70 to use as a segmentation model for all images in the set. (FIG. 4G). This smoothing step fills in any gaps in the foreground to create a single foreground region for encompassing the foreground object.

The process ends at S214 with the mask 70 being output to be used in subsequent steps, such as S110 and S114 and S116. In step S114, for example, the pixels of the image 26A, B, C, D, etc corresponding to the black pixels of the mask 70 are processed as background. For example, the mask may be applied to the input image 26A, 26B, 26C, or 26D by aligning it with the respective center of gravity C.

In step S116, the pixels of the image 26A, B, C, D, etc corresponding to the white pixels of the mask 70 are processed as foreground.

This method is sufficiently general enough to be applied to categories of images other than headshots which contain objects with relatively consistent shape.

Other techniques for segmenting the images may be used. For example, in one embodiment, a method as described in above-mentioned U.S. application Ser. No. 12/191,579 may be used for the segmentation. In this approach, pixels of the image are scored based on relevance scores of patches of the image with respect to the assigned object category.

Target Image Selection (S108, S112)

Optionally, the target images with desired aesthetic characteristics for composition, background and foreground regions are manually selected. Relative comparison of the input images can lead to the identification of the image(s) characterized by the best aesthetic quality. In this context, for quality the combination of characteristics such as image composition, brightness, color balance, blurring, noise, contrast may be considered.

The user can select up to three different images that are used as targets (for composition, foreground, and background harmonization, respectively). In an alternative embodiment, the selection can be automatic. For example, a model of "preferred" images is learned from a dataset of manually labeled images. The trained model is them applied to the input images to identify the optimum image for each harmonization type.

Image Composition Harmonization (S110)

The composition of all the images is altered according to the composition features of the target image or to some prior heuristic (e.g. rule of thirds). For example, the center of mass location and relative size of the object in the target image are identified and these characteristics used as a basis for modifying those of the other images to emulate the target image. In some instances, it may be difficult to match the target image, but overall, the modifications generally bring the images closer to the target in their compositional characteristics.

The objective of this step is to achieve foreground objects with close to the same size and resolution. In the case of faces, the location of the face in the image may also be considered. Therefore, the composition harmonization step may include two different processing operations: first, resizing of the image and second, cropping the image. The operations can be applied jointly or independently. This step can be achieved by taking into account the position of the main object in the target composition image and registering all the other images based on it. In the specific case of a headshot, the position of heads can be described using the method disclosed in Jones, M. J., Rehg, J. M., Statistical Color Models with Application to Skin Detection, IJCV(46), No. 1, January 2002, pp. 81-96.

Another suitable method may involve using the position of the eyes combined with the size of each face oval.

Foreground Harmonization (S114)

The regions corresponding to the foreground 72 (FIG. 4H) of all input images are harmonized by altering characteristics of one or more of the images, such as light and the colors of the foreground objects are harmonized using, as a reference, the target foreground image. In particular, several characteristics of the images are evaluated for each image in the set. For each characteristic, a target characteristic, which may be obtained from the target foreground image, is identified. The characteristics of all the images are harmonized, based on the target characteristics, e.g., by manipulation of the characteristics of those images which do not match the target characteristics. The type of manipulation may depend on the characteristic and may include generating one or more transforms for mapping pixel values of the original image to pixels values of the manipulated image and applying the transform(s) to the original image. The same transform or set of transforms may be applied to all the images in the set or separate transforms generated for each image. Transforms can be created for color balance, sharpness, white balance, resolution, color noise, brightness, contrast, luminosity, and the like.

In one embodiment, the characteristics harmonized for the foreground region are different from those harmonized for the background region (i.e., at least one of the characteristics to be harmonized is different).

In general, foreground harmonization can be achieved simply by adjusting the light and the colors of the various images in relation to the image chosen as a target for foreground regions. For images containing headshots, the following two methodologies may be employed for fixing light and color respectively:

1. Exposure Enhancement. This refers to the average of the global distribution of intensity along the dynamic range of the image. Making the image darker or lighter can bring details from the shadows or give depth to the colors of the photograph. One approach to correcting exposure is to apply gamma correction to the image intensity. For example, the gamma parameter may be determined automatically from the histogram of the input image, as described in Eschbach, R. and Fuss, W., "Automatic Enhancement of Scanned Photographs," in EI Color Imaging: Device Independent Color, Color Hardcopy and Graphic Arts (1999) and U.S. Pat. No. 5,414,538, issued May 9, 1995, entitled IMAGE-DEPENDENT EXPOSURE ENHANCEMENT, by Eschbach. The exemplary method evaluates the occupancy of the dynamic range of the image and, based on predefined thresholds, determines an appropriate correction it has to perform (e.g., over-expose, under-expose) and also the amount of correction (low, medium, high). Gray snow is typically under-exposed snow, and the system should over-expose it.

Color transfer refers to a process for harmonizing color. In the case of headshots it is desirable to decrease differences in the skin tones (a combination of hue and saturation, rather than specific colors), but leave hair color unchanged. This step is intended to remove differences caused by differences in illumination or camera settings, so that the faces of images appear to have been taken under the same conditions, but not to change the natural skin colors.

Techniques for harmonizing color are described, for example, in above-mentioned U.S. application Ser. No. 12/045,807, incorporated by reference. In the Ser. No. 12/045,807 application, an image adjustment system and method are disclosed. The method includes adapting a universal palette to generate (i) an input image palette statistically representative of pixels of an input image and (ii) a reference image palette statistically representative of pixels of a reference image, and adjusting at least some pixels of the input image to generate adjusted pixels that are statistically represented by the reference image palette.

In applying this method to the present exemplary embodiment, the target foreground image selected for the foreground harmonization may be used to drive the color transfer step, i.e., the input image palette is statistically representative of pixels of the entire input image (or only the foreground region of an input image) and the reference image palette is statistically representative of pixels of the entire reference (target foreground) image (or only the foreground region of the target foreground image). This relatively conservative method is particularly adapted to headshots where any color changes which cause the face to have an unnatural appearance are undesirable. An even more conservative method employs face detection techniques (which identify skin pixels) to identify the face region of the images, and then these skin regions are harmonized by generating the input image palette and reference palette from these regions, leaving other regions of the foreground unchanged.

If the image contains other objects, such as cars or vehicles, a more aggressive color harmonization can be employed e.g. resulting in higher saturation of car colors.

Background Harmonization (S116)

The regions corresponding to the background 74 (FIG. 4H) of all input images are harmonized by altering characteristics of one or more of the images, such as saturation, cropping regions, and the like harmonized using, as a reference, the target background image. In particular, several characteristics of the images are evaluated for each image in the set. For each characteristic, a target characteristic, which may be obtained from the target background image, is identified. The characteristics of all the images are harmonized, based on the target characteristics, e.g., by manipulation of the characteristics of those images which do not match the target characteristics. The type of manipulation may depend on the characteristic and may include generating one or more transforms for mapping pixel values of the original image to pixels values of the manipulated image and applying the transform(s) to the original image. The same transform or set of transforms may be applied to all the images in the set or separate transforms generated for each image. Transforms can be created for color balance, sharpness, and the like.

In one embodiment, the background harmonization includes the following harmonization processes:

1. Color transfer. This step may be performed as described for the foreground region but in this case, the target background image drives the color transfer step (serves as the reference image) in the method of application Ser. No. 12/045,807.

2. De-saturation. This step may reduce the saturation of the background regions of the images so that even if the colors are somewhat different, the background will not be distracting.

3. Cropping. In this step, the foreground object may be recentered and cropped to generate foreground objects of similar size if this step has not already been performed in the image composition harmonization step.

The results of the various methods can depend on the quality of the segmentation step. In general, it is appropriate to opt for a safe method able to guarantee a uniform background without degrading the foreground object. In one embodiment, the only background harmonization step involves a simple cropping operation.

Blending (S118)

The background and foreground regions 72, 74 as modified in the previous steps are combined. The blending may be performed by a process known as alpha blending, as described, for example in U.S. Pat. No. 5,767,867, entitled METHOD FOR ALPHA BLENDING IMAGES UTILIZING A VISUAL INSTRUCTION SET, issued Jun. 16, 1998, by Hu.

Without intending to limit the scope of the exemplary embodiment, the following example demonstrates its application on two image datasets.

Example

Two image datasets were extracted from two sources, one from a picture gallery of company employees, the other from a company newsletter. Each dataset included 15 images containing headshots with different aesthetic features.

Two different algorithms for color transfer were compared, given an image chosen as a target. The target image is characterized by a balanced skin tone and perfect exposure. When all pixels of the target image were used for the reference palette using the method of Ser. No. 12/045,807, green artifacts were introduced into the skin regions of the modified images. This could be readily overcome by employing the foreground/background region segmentation maps and, in the case of the foreground, selecting only pixels from the segmented foreground region to generate the palettes. This ensured that only the features of the skin are transferred. In particular, the statistics evaluated for the transformation can be calculated only on skin pixels regions ensuring safer results.

In addition, a simple strategy for background harmonization has been tested using cropping. Based on the background and foreground segmentation result allows cropping out the portions of the images that are indicated as background.

The exemplary method has advantages over prior attempts at harmonizing images. This may be due in part to the use of information on the content of the image to guide the harmonization task (e.g., by using categorization techniques such as generic visual classification and skin detection). In contrast, a global approach for synthesizing the aesthetic features of the images has been proven to be inefficient and very much affected by unpredictable errors. By leveraging segmentation techniques, the method is able to apply different strategies for the harmonization of background and foreground.

In summary, in one aspect, the exemplary system and method harmonize the aesthetic features (composition, light, and color) of the images with a model based approach involving the selection of target images used as references. In another aspect, foreground and background regions are harmonized separately.

The exemplary system and method find application in the creation of documents in which the images in the set are to be displayed in close proximity to one another. For example, image and document asset management or document image/photograph set visualization, and the like can also profit from the system and method. Other applications include variable data applications such as one-to-one personalization and direct mail marketing, where the images may be incorporated into separate documents which are intended to have a consistent appearance. Variable document creation poses various challenges to the assurance of a proper aesthetical level due the portion of dynamic content they include. One of these challenges is how to treat visual aspects dynamically within the variable data workflow, so that the enhancement or management operations are handled in a more context sensitive fashion.

This methodology can be applied to images with a variety of different types of content. Particularly suitable are those images containing faces. Other suitable images are those containing objects or category of objects popular in on-line auctions (e.g., on web-based services, such as eBay), such as cars, furniture, crafts, books and electronic equipment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image harmonization system comprising:
memory which stores a set of processing components and a processor in communication with the memory which executes the processing components, the processing components comprising:
a segmenting component which, for each of a plurality of input images, segments the image into a foreground region and a background region;
a foreground harmonization component which harmonizes the foreground regions of the input images; and
a background harmonization component which harmonizes the background regions of the input images separately of the foreground regions, the foreground harmonization component applying a different harmonizing process from the background harmonization component.

2. The harmonization system of claim 1, the processing components further comprising:
a categorizer for assigning a category to the images from a set of content-based categories.

3. The harmonization system of claim 2, wherein the set of content-based categories includes a headshot category and at least one object category.

4. The harmonization system of claim 2, wherein the segmenting component receives as input the assigned category and wherein the segmentation is based on the assigned category.

5. The harmonization system of claim 2, wherein the foreground harmonization component receives as input the assigned category and wherein the foreground harmonization is based on the assigned category.

6. The harmonization system of claim 1, wherein the segmenting component generates a mask, based on the plurality of input images, which identifies a background region and a foreground region, the mask being applied to each of the images to identify the foreground and background regions.

7. The harmonization system of claim 1, wherein foreground harmonization component harmonizes at least one characteristic of the foreground regions of the input images selected from color and exposure.

8. The harmonization system of claim 1, wherein at least one of the foreground harmonization component and background harmonizing component harmonizes the images to reduce differences between a selected target image of the plurality of images and others of the plurality of images.

9. The harmonization system of claim 8, wherein the target foreground or background image is selected by a user.

10. The harmonization system of claim 1, further comprising a composition harmonizing component for harmonizing composition of the input images by reducing differences between a target image of the input images and others of the input images.

11. An image harmonization system comprising:
  memory which stores a set of processing components and a processor in communication with the memory which executes the processing components, the processing components comprising:
  a segmenting component which, for each of a plurality of input images, segments the image into a foreground region and a background region;
  a foreground harmonization component which harmonizes the foreground regions of the input images, the foreground harmonizing component comprises comprising:
    an adaptive palette processor configured to adapt a universal palette to generate (i) an input image palette statistically representative of pixels of at least one of the input images and (ii) a target image palette statistically representative of pixels of a target image and
    an image adjustment processor configured to adjust at least some pixels of the input image to generate adjusted pixels that are statistically represented by the target image palette; and
  a background harmonization component which harmonizes the background regions of the input images separately of the foreground regions.

12. The system of claim 11, wherein the input image palette is representative of pixels in the foreground region of the at least one input image and the target image palette is statistically representative of pixels in the foreground region of the target image.

13. The harmonization system of claim 11, wherein the foreground harmonization component applies a different harmonizing process from the background harmonization component.

14. An automated harmonization method comprising:
  for each of a plurality of input images, segmenting the image into a foreground region and a background region;
  harmonizing the foreground regions of the input images; and
  harmonizing the background regions of the input images separately of the foreground regions, wherein the foreground harmonization includes harmonizing a first set of characteristics and the background harmonization includes harmonizing a second set of characteristics, the first set being different with respect to at least one characteristic, from the second set;
  for at least one of the images, blending the foreground and background regions into a combined image; and
  outputting the at least one image.

15. The harmonization method of claim 14, further comprising:
  assigning a category to the input images from a set of content-based categories.

16. The harmonization method of claim 15, wherein the segmentation is based on the assigned category.

17. The harmonization method of claim 15, wherein at least one of the foreground harmonization and background harmonization is based on the assigned category.

18. The harmonization method of claim 15, wherein the segmentation comprises generating a binary mask which identifies foreground and background regions and applying the mask to each of the images in the plurality of images.

19. The harmonization method of claim 14, wherein the foreground harmonization includes harmonizing at least one characteristic of the foreground regions of the input images selected from color and exposure.

20. The harmonization method of claim 14, wherein the foreground harmonization comprises modifying pixel values of at least one of the input images.

21. The harmonization method of claim 14, further comprising selecting a target image from the set of images for at least one of foreground, background and composition harmonization and wherein the at least one of foreground, background and composition harmonization includes harmonizing other images in the set to reduce differences between the selected target image and the other images.

22. A computer program product comprising a non-transitory computer-readable recording medium which encodes instructions which, when executed by a computer, perform the method of claim 14.

23. An automated harmonization method comprising:
  for each of a plurality of input images, segmenting the image into a foreground region and a background region;
  assigning a category to the input images from a set of content-based categories;
  harmonizing the foreground regions of the input images, wherein when the assigned category is a headshot category, the foreground harmonization includes identifying pixels of the foreground region corresponding to a face of a target image and another image form the set of images and decreasing differences in skin tones between the identified pixels of the target image and the identified pixels of the other of the input images; and
  harmonizing the background regions of the input images separately of the foreqround regions;
  for at least one of the images, blending the foreground and background regions into a combined image; and
  outputting the at least one image.

24. The harmonization method of claim 23, wherein the foreground harmonization includes harmonizing a first set of characteristics and the background harmonization includes harmonizing a second set of characteristics, the first set being different with respect to at least one characteristic, from the second set.

25. A harmonization method comprising:
  inputting a set of digital images;
  for each of a plurality of the input images, automatically segmenting the image into a foreground region and a background region;
  selecting a target foreground image from the input images;
  selecting a target background image from the input images;
  providing for automatic harmonization of the foreground region of at least one of the input images with the target foreground image; and
  providing for automatic harmonization of the background region of at least one of the input images with the target background image, including providing for harmonizing characteristics for the background region that are different from characteristics harmonized for the foreground region;

providing for blending the optionally harmonized foreground and background regions of respective segmented images; and outputting the set of images.

* * * * *